Patented Apr. 22, 1947

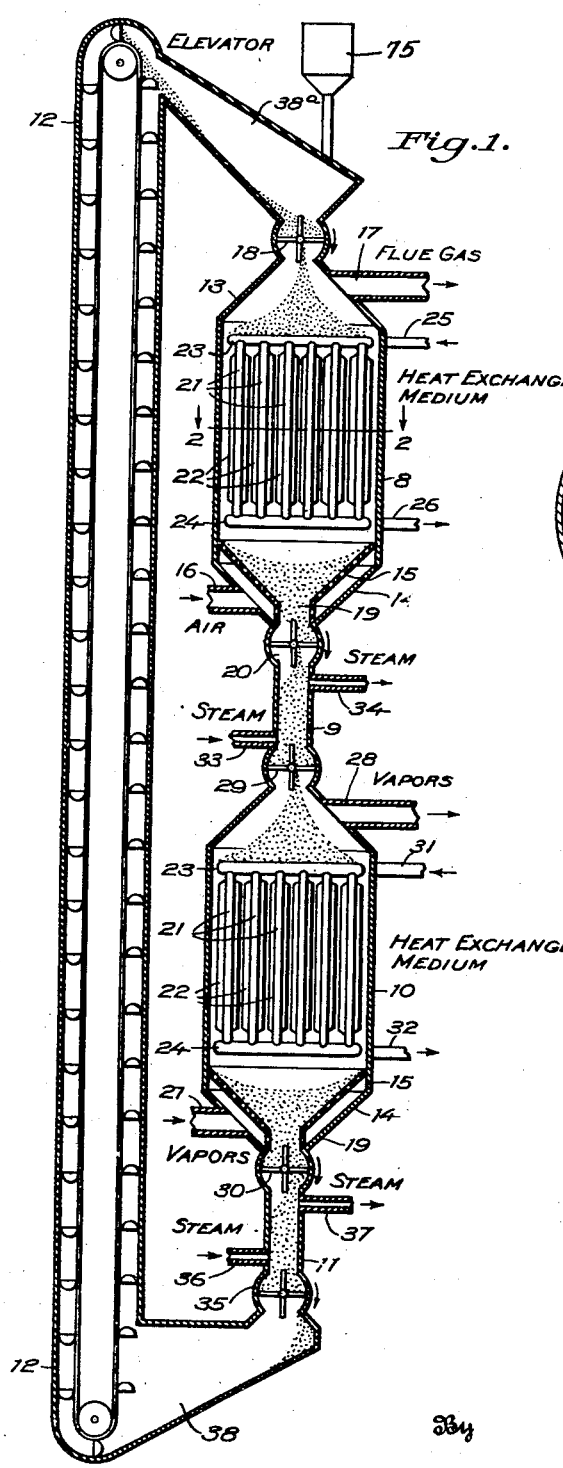
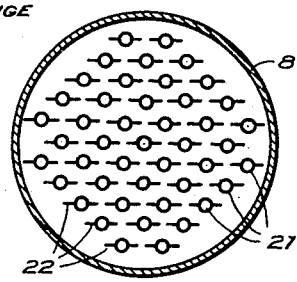
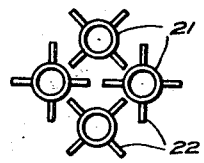
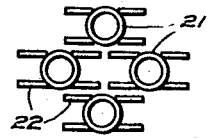

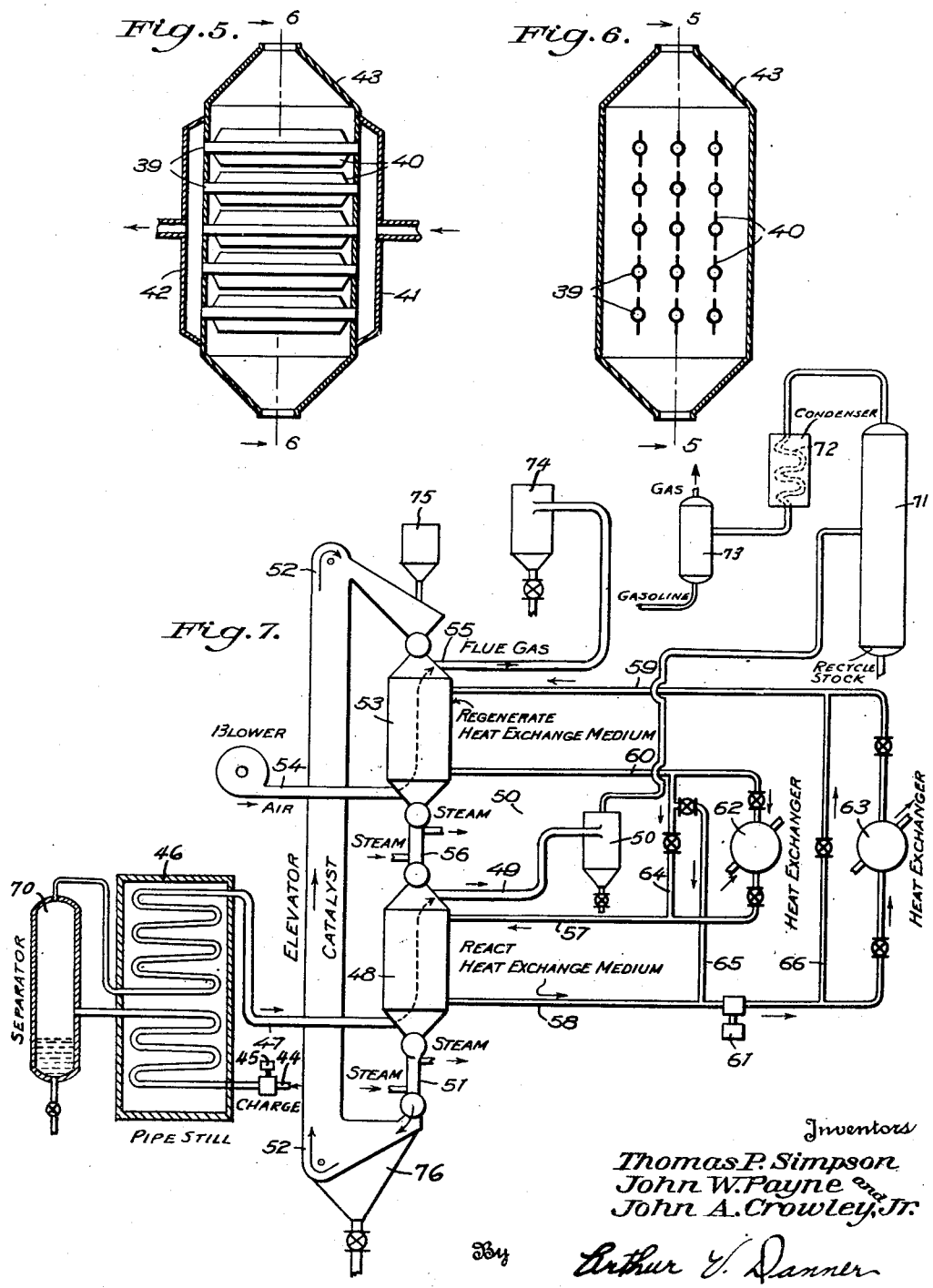

2,419,508

UNITED STATES PATENT OFFICE 2,419,508

APPARATUS FOR CATALYTIC CONVERSION

Thomas P. Simpson, John W. Payne, and John A. Crowley, Jr., Woodbury, N. J., assignors to Socony-Vacuum Oil Company, Incorporated, New York, N. Y., a corporation of New York Application October 1, 1941, Serial No. 413,102

6 Claims. (Cl. 23—260)

This invention is directed to apparatus for conducting reactions in the presence of a contact mass, such as, for example, the catalytic conversion of hydrocarbons, and to apparatus for carrying out such methods.

It is known that many operations for the conversion of hydrocarbon materials to other hydrocarbon materials of differing physical and/or chemical properties may be carried out catalytically. Most of these are carried out by contacting the hydrocarbon, usually in vapor form and at high temperature, with a contact mass composed of particles which themselves have a catalytic effect, or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic dehydrogenation, hydrogenation, desulphurizing, partial oxidation and similar conversions of hydrocarbon materials. The method of operation and apparatus herein disclosed are applicable to all such conversions. Of these operations, the vapor phase cracking of heavy hydrocarbons to gasoline is typical, and this specification will hereinafter discuss such operation as exemplary, without, however, intending to be limited thereby or thereto except by such limits as may appear in the claims.

Such catalytic processes generally make use of reaction chambers containing a fixed body of catalyst or contact mass, through which the reaction mixture is passed, and in which, after the reaction has slowed down to an uneconomic point, the contact mass is regenerated in situ. Such processes are not continuous, and only attain continuity by the provision of numerous reaction chambers which are alternately placed on stream and on regeneration. Likewise, it is difficult to maintain constant quantity and quality of product without numerous chambers and intricate scheduling, due to the progressively decreasing activity of catalyst. This same feature, with apparatus limitations, prevents, to a degree, the use of catalyst at a uniform high efficiency level. Most of these difficulties may be avoided by the use of a method wherein the catalyst or contact mass is handled continuously as well. This invention is specifically directed to such a process.

This invention has for its object the provision of a process of hydrocarbon oil conversion wherein a continuously moving stream of hydrocarbon oil is contacted with a continuously moving stream of catalyst for the accomplishment of conversion, in which the catalytic material is used only at a high level of efficiency, and in which the catalytic material is continuously regenerated and returned to the conversion step, both operations being conducted under controlled conditions. An equally important object is the provision of proper apparatus in which such a process may be carried out.

This invention is based upon the principle of carrying out catalytic reactions by flowing a stream of reaction mixture in physical contact with a flowing stream of catalytic material, through a reaction zone in which it is in heat exchange relationship with a heat exchange medium at a controlled temperature.

In order that this invention may be understood, reference is made to the drawings attached to and made a part of this specification. In these drawings, Figure 1 shows in diagram form a reaction and regeneration apparatus suitable for use in this process. Figures 2, 3, 4, 5, and 6 are concerned with internal details of such chambers, and Figure 7 shows in diagram form a set-up of apparatus suitable for the conversion of hydrocarbon oils.

In Figure 1, character 8 denotes a regeneration chamber, 9 a purging section, 10 a reaction chamber, 11 a second purging section, and 12 an elevator for catalyst particles. Regeneration chamber 8 and reaction chamber 10 are similar in construction and internal fittings and consist (referring now to 8), of an exterior shell 8, which may be cylindrical or rectangular in cross-section, with a convergent sealed top 13 and a convergent bottom 14, and fitted with an interior false bottom 15, which is perforate, the perforations therein being too small for the passage of catalyst particles but permitting the passage of liquid or gas. Bottom 14 is fitted with pipe 16, and top 13 with pipe 17. At the top of 13 is a sealed feeding device 18, which may be a star wheel as shown, an intermittently operated valve set-up or other common device of this nature. Catalyst material introduced through 18 fills the interior of shell 8, passes down therethrough, is collected by false bottom 15 and chute 19 and is removed by a second intermittently operating device, such as star wheel 20. This arrangement effects a continuously moving stream of catalytic material through shell 8. Reaction mixture, in this case air for an oxidizing regeneration, may be introduced through pipe 16 and products of reaction, in this case flue gas, may be removed through pipe 17. This effects a continuously flowing stream of reaction material in physical contact with the continuously flowing stream of catalytic material in shell 8. The flow shown is countercurrent. If desired, it may be made concurrent by reversing the functions of 16 and 17. Shell 8 is also internally fitted with a series of conduits 21, equipped with fins 22, joined to headers 23 and 24, through which a heat exchange medium may be passed by means of pipes 25 and 26. The heat exchange medium may be used to control the temperature of reaction by extraction of heat from or addition of heat to the material within shell 8, and its flow may be concurrent, countercurrent, or, as later shown, transverse to the direction of flow of catalytic material. Shell 10 is similarly fitted and similarly operated. Reaction material, in this case hydrocarbons, is introduced by 27, and removed by 28, catalyst movement is controlled by 29 and 30, and heat exchange medium is circulated by pipes 31 and 32. Confined passage 9, maintained relatively full of catalyst by devices 20 and 29, is fitted with pipes 33 and 34, by means of which steam may be passed through the catalyst for purging. A similar purging passage 11 lies below shell 10, is controlled by devices 30 and 35, and fitted with steam pipes 36 and 37 for purging catalyst after reaction. From 11 the catalyst drops through 35 into boot 38 of elevator 12 by which it is elevated and discharged into bin 38a above shell 8. Elevator 12 may be of the belt and bucket type shown or of any other kind suitable for the physical properties of the catalytic materials. Customary devices for the removal of fines and the addition of makeup may be inserted in the catalyst conveyor system. The removal of fines is conveniently accomplished by cyclone separators 50 and 74 on the discharge lines from the chambers and by a screen bottom for boot 38 as shown in Figure 7 and more particularly described hereinafter. Fresh catalyst for make-up may be added by hopper 75. Special attention should be given to the arrangement of heat exchange tubes within the shells 8 and 10. These should be so arranged as to promote the passage of catalytic material and reaction material longitudinally through the shell in such manner that the flowing material is at all times in heat exchange relationship with the heat exchange medium. The conduits may be unfinned, but better results are obtained if the external heat transfer surface of the heat exchange tubes is augmented by the addition of fins thereto. These fins, primarily added for heat transfer reasons may be taken advantage of to assist in control of the flow of catalyst and reaction fluid and contact therebetween by being disposed so that they, together with the tubes, divide the space within the shell into a series of longitudinal passages of substantially constant cross-section throughout their length. These passages should be of such dimenions that all portions of the reaction material therein are in efficient heat exchange relationship with the heat exchange medium in the tubes. The proper dimensions for this condition depend somewhat upon the physical nature of the catalyst. A commonly used catalyst for such purposes is a rod shaped clay particle, about 2½ mm. diameter by 4 mm. average length, and with such particles the passages should be so arranged that no catalyst particle will be further removed from a heat extractive surface than about 1 inch, and the total volume in cubic inches of the passages containing catalyst and reaction mixture should be numerically about one-eighth to twice the surface in square inches of the heat transfer surface in contact with the passages. Catalyst particles of different heat conductivity, or of different packing characteristics, or variations in the contemplated intensity of reaction per unit volume of catalyst, as well as considerations of heat transfer and pressure drop will vary the ratio somewhat. The length of the reaction and regeneration passages should be relatively great, say from 3 to 15 feet.

Figure 2 shows a cross-section of case 8 at the level 2—2 showing how the preferred longitudinal passages may be formed by equipping each heat exchange tube with two diametrically opposed, longitudinally disposed axial fins. Figures 3 and 4 show other ways of arriving at the same result. The heat transfer tubes need not be arranged parallel to the flow of catalyst, but may well be transverse thereto, as shown in Figures 5 and 6, wherein transverse tubes 39, carrying fins 40, extend between header boxes 41 and 42 in a shell 43, to exercise the same functions as corresponding parts in shells 8 and 10.

The heat exchange medium may be any fluid suitable for the load and temperature levels encountered, such as gases, liquids of various kinds, molten metals, or alloys, or fused salts. Preferably it should be possessed of a low vapor pressure, low viscosity, and high specific heat at temperatures between 600° and 1100° F., non-corrosive to steel, and fluid at about 300°–350° F. so that it may be removed from shut-down apparatus by steam heating. Convenient materials for such use are mixtures of the strong alkali salts of the oxy-acids of nitrogen.

Passages 9 and 11, used for purging by passing steam through the catalyst particles, should be so proportioned that a sufficient contact of steam and catalyst particles occurs to remove most of the residual products of the preceding reaction.

Turning to Figure 7, which shows an operating set-up appropriate for a conversion of hydrocarbons, such as, for example, a vapor phase cracking, we find charge oil fed through pipe 44 by pump 45 to a vapor preparation unit which will consist essentially of a heater 46, for which purpose any of the usual forms of heater common in the art, say a pipe still, may be used, to heat and vaporize the charge and heat it to reaction temperature, and, if the charge used is not wholly vaporized at the reaction temperature, a vapor separator 70 to remove unvaporized liquid residue. Vapors from 46 move through pipe 47 into and through reaction chamber 48, (the same as 10, Figure 1), and therein undergo catalytic reaction. Reaction products pass through pipe 49 to product purification and recovery equipment including a cyclone separator 50 to remove entrained fine catalyst, a fractionating column 71, condenser 72 and a receiver 73 from which gas is discharged. The system of product purification and recovery equipment may be made up of any of the usual fractionation, separation, and disposal devices currently in common use for handling products of cracking reactions. If desired, product fractions boiling above the desired low-boiling product may be returned to the system for retreatment, either separately or in admixture with fresh charge. Catalytic material flowing from 48 is purged in 51 passes over a screen therebelow from which fines fall into hopper 76 and elevated by 52 to be introduced into 53 wherein it is regenerated by burning with air supplied by blower and pipe 54, the products of regeneration being disposed of through pipe 55, after which the regenerated catalyst is purged in 56 and returned to 48. The temperature level of the reaction in 48 may be controlled and latent heat of reaction added thereto by a heat exchange medium introduced through pipe 57 and removed through pipe 58. The same heat exchange medium may be used to control the temperature of regeneration in 53 and to remove heat therefrom, being introduced into 53 by pipe 59 and removed by pipe 60. The heat exchange medium is circulated by pump 61 and the temperature for the several uses may be controlled by use of various combinations of heat exchangers 62 and 63 and by-passes 64, 65, and 66 in a manner obvious to those skilled in the art.

As an example of one operation successfully conducted in such apparatus, according to the process herein disclosed, coastal gas oil with which was admixed steam to the extent of about $$\frac{10 \text{ oil}}{1 \text{ water}}$$

(cold volumes), at a temperature of 800° F. was contacted with a catalyst of activated clay granules at a ratio of one volume of oil (cold) to four volumes of clay in a chamber through which the clay passed at such a rate that it remained in the reaction zone about twenty minutes, with the following results:

Yield of 410° E. P. gasoline (including isobutane and heavier in gas)
      volume per cent__ 67.4
Yield of dry gas (lighter than isobutane)
      weight per cent__ 4.0
Yield of coke _____do____ 2.5
Yield of recycle stock __volume per cent__ 35.0

In this run the catalyst was passed through the regeneration chamber, (of the same size as the reaction chamber), at the same rate, and was burned with a sufficient volume of air to maintain about 10% $CO_2$ in the exit flue gas.

The temperature of the reaction was held by use of the heat exchange medium at 800° F., and in the same manner the temperature of the regeneration was not allowed to rise above 1100° F.

The gasoline produced was of excellent quality, high in anti-knock rating, and the recycle stock was clean, light in color, and of about the same boiling point as the charge. No high boiling, dirty, liquid cracking tar was produced. The regenerated catalyst was equal in efficiency to new catalyst, no detectable deterioration in quality being found.

It is to be understood that the specific examples and numerical data herein disclosed are set forth only as exemplary, and that the invention is not to be limited thereby or thereto, but is to be subject only to those limitations expressed in the following claims.

We claim:

1. Apparatus for continuous catalytic cracking of hydrocarbon oils comprising a pipe still for heating said oils to a cracking temperature, a cracking chamber provided with a catalyst inlet and a catalyst outlet and also provided with a charging stock inlet and a cracked product outlet, a transfer line connecting said charging stock inlet with said pipe still, a fractionating system, means for introducing products from the cracked product outlet to said fractionating system, a revivification chamber provided with a catalyst inlet and a catalyst outlet and also with a revivification medium inlet and a revivification medium outlet, means for substantially directly transferring hot spent catalyst from said cracking chamber outlet to said revivification chamber inlet while the cracking and revivification operations are in progress, said means comprising a valve adapted to transfer catalyst while preventing substantial flow of gas therethrough, and means for substantially directly transferring hot revivified catalyst from said revivification chamber outlet to said cracking chamber inlet while the cracking and revivification operations are in progress, said last-mentioned means comprising at least one valve adapted to transfer catalyst while preventing substantial flow of gas therethrough.

2. Apparatus for continuous catalytic cracking of hydrocarbon oils comprising a pipe still for heating said oils to a cracking temperature, a cracking chamber provided with a granular catalyst inlet and a granular catalyst outlet and also provided with a charging stock inlet and a cracked product outlet, said inlets and said outlets being positioned at opposite ends of said chamber, a transfer line connecting said charging stock inlet with said pipe still, a fractionating system, means for introducing products from the cracked product outlet to said fractionating system, a revivification chamber provided with a granular catalyst inlet and a granular catalyst outlet and also with a revivification medium inlet and a revivification medium outlet, said last-mentioned inlets and said last-mentioned outlets being positioned at opposite ends of said revivification chamber, means for substantially directly transferring spent granular catalyst from said cracking chamber outlet to said revivification chamber inlet while the cracking and revivification operations are in progress, said means comprising a valve adapted to transfer granular catalyst while preventing substantial gas flow between said two chambers, and means for substantially directly transferring revivified granular catalyst from said revivification chamber outlet to said cracking chamber inlet while the cracking and revivification operations are in progress, said last-mentioned means comprising at least one valve adapted to transfer granular catalyst while preventing substantial gas flow between said two chambers.

3. A system for the catalytic conversion of petroleum hydrocarbons which comprises a substantially vertical conversion chamber, means including a substantially gas-tight valve above said chamber for admitting catalyst thereto and preventing vapor loss therefrom, means including a substantially gas-tight valve below said chamber for maintaining said chamber substantially full of catalyst material and for discharging catalyst therefrom at substantially the rate at which it is introduced thereto, means for continuously heating the hydrocarbon vapors to the conversion temperature and for passing said heated vapors through said chamber, a fractionating system, means for introducing products from said conversion chamber to said fractionating system, a catalyst regeneration chamber, means including the second-named substantially gas-tight valve below said conversion chamber for transferring spent catalyst from said conversion chamber to said regeneration chamber and for preventing gases and vapors from the regeneration chamber from gaining access to said conversion chamber, means including a third gas-tight valve below the regeneration chamber for discharging regenerated catalyst therefrom at substantially the rate at which it is introduced thereto while preventing the escape of regeneration gases and vapors and means for returning regenerated catalyst discharged through said third-named gas-tight valve for introduction through said first-named gas-tight valve.

4. The apparatus of claim 1 which includes a foraminous wall in said cracking chamber at the charging stock inlet for distributing introduced vapors into the catalyst material.

5. Apparatus for continuous catalytic conversion of fluid petroleum hydrocarbons comprising charging stock delivery means, a conversion chamber provided at its opposite ends with an inlet for catalyst in solid particle form and an outlet for catalyst in solid particle form and also provided at its opposite ends with a charging stock inlet and a converted product outlet, a revivification chamber provided at its opposite ends with an inlet for catalyst in solid particle form and an outlet for catalyst in solid particle form and also provided at its opposite ends with a revivification medium inlet and a revivification medium outlet, means for substantially directly transferring spent catalyst from said conversion chamber outlet to said revivification chamber inlet while the cracking and revivification operations are in progress, and means for substantially directly transferring revivified catalyst from said revivification chamber outlet to said conversion chamber inlet while the cracking and revivification operations are in progress, each of said transferring means including gas-tight catalyst passage means adapted to direct a substantially continuous transfer of the catalyst to the conversion and revivification chambers respectively and being provided with a chamber having an inlet and an outlet for the passage of an inert fluid for purging the catalyst.

6. Apparatus for continuous catalytic cracking of hydrocarbon oils comprising a pipe still for heating said oils to a cracking temperature, a cracking chamber provided with a granular catalyst inlet and a granular catalyst outlet and also provided with a charging stock inlet and a cracked product outlet, said inlets and said outlets being positioned at opposite ends of said chamber, a transfer line connecting said charging stock inlet with said pipe still, a fractionating system, means for introducing products from the cracked product outlet to said fractionating system, a revivification chamber provided with a granular catalyst inlet and a granular catalyst outlet and also with a revivification medium inlet and revivification medium outlet, said last-mentioned inlets and said last-mentioned outlets being positioned at opposite ends of said revivification chamber, means for transferring hot spent granular catalyst from said cracking chamber outlet to said revivification chamber inlet while the cracking and revivification operations are in progress, said means comprising a valve adapted to transfer granular catalyst, means for maintaining a zone of inert gas adjacent the downstream side of said last-mentioned valve to prevent the escape of reactant gas from said cracking chamber and means for transferring hot revivified granular catalyst from said revivification chamber outlet to said cracking chamber inlet while the cracking and revivification operations are in progress, said last-mentioned means comprising at least one valve adapted to transfer granular catalyst and means for maintaining a zone of inert gas on the upstream side of said last-mentioned valve to prevent the escape of reactant gas from said cracking chamber.

THOMAS P. SIMPSON.
JOHN W. PAYNE.
JOHN A. CROWLEY, Jr.

REFERENCES CITED

The following references are of record in the file of this patent:

UNITED STATES PATENTS

| Number | Name | Date |
|---|---|---|
| 2,209,040 | Simpson et al. | July 23, 1940 |
| 2,217,703 | Pew, Jr., et al. | Oct. 15, 1940 |
| 2,236,083 | Alther | Mar. 25, 1941 |
| 2,239,801 | Voorhees | Apr. 29, 1941 |
| 2,246,654 | Arveson | June 24, 1941 |
| 2,264,438 | Gaylor | Dec. 2, 1941 |
| 1,882,000 | Cross | Oct. 11, 1932 |
| 2,183,301 | Bossner et al. | Dec. 12, 1939 |
| 1,940,651 | Semmes | Dec. 19, 1933 |
| 2,023,205 | Olsen | Dec. 3, 1935 |
| 1,836,301 | Bechthold | Dec. 15, 1931 |

FOREIGN PATENTS

| Number | Country | Date |
|---|---|---|
| 533,037 | German | Sept. 8, 1931 |
| 254,011 | British | June 25, 1926 |
| 255,159 | British | July 19, 1926 |
| 364,665 | British | Jan. 4, 1932 |
| 383,616 | British | Feb. 13, 1931 |

Certificate of Correction

Patent No. 2,419,508.                                                                                              April 22, 1947.

THOMAS P. SIMPSON ET AL.

It is hereby certified that error appears in the printed specification of the above numbered patent requiring correction as follows: Column 5, line 45, for "about 10%" read *above 10%*; and that the said Letters Patent should be read with this correction therein that the same may conform to the record of the case in the Patent Office.

Signed and sealed this 15th day of July, A. D. 1947.

[SEAL]

LESLIE FRAZER,
*First Assistant Commissioner of Patents.*